United States Patent [19]

DeRouen et al.

[11] 3,752,318
[45] Aug. 14, 1973

[54] LIQUID SEPARATION APPARATUS
[75] Inventors: Ray J. DeRouen, New Iberia, La.; Ray Tuggle; Richard H. Graves, both of Bellaire, Tex.
[73] Assignee: Texaco Inc., New York, N.Y.
[22] Filed: Dec. 6, 1971
[21] Appl. No.: 205,141

[52] U.S. Cl. ................................ 210/251, 210/522
[51] Int. Cl. ............................................. C02c 1/26
[58] Field of Search.......................... 210/83, 84, 305, 210/320, 532, 515, 523, 522, 534, 169, 251

[56] References Cited
UNITED STATES PATENTS

| 801,679 | 10/1905 | Niclausse | 210/522 |
| 3,297,163 | 1/1967 | Landon | 210/169 X |
| 2,314,977 | 3/1943 | Green | 210/522 X |
| 1,820,974 | 9/1931 | Hills | 210/305 |
| 2,261,101 | 10/1941 | Erwin | 210/84 X |
| 1,940,794 | 12/1933 | Fisher | 210/522 |

Primary Examiner—Samih N. Zaharna
Assistant Examiner—T. A. Granger
Attorney—Thomas H. Whaley et al.

[57] ABSTRACT

The invention relates to an apparatus for effecting the separation of a multi-phase liquid mixture comprising water, and a hydrocarbon or similar material characterized by a specific gravity not exceeding the specific gravity of water. The apparatus comprises an elongated casing into which the said liquid mixture is introduced. The latter is then caused to pass through a labyrinthine passage formed of continuous, though discrete passage segments in a general vertical direction. In the course of traversing said passage, the water will gravitate toward the lower end of the casing, and be discharged. The non-aqueous liquid phase segment will rise outwardly and upwardly within the discrete segments of said passage, whereby to be readily withdrawn from the apparatus.

5 Claims, 2 Drawing Figures

Patented Aug. 14, 1973 3,752,318

LIQUID SEPARATION APPARATUS

BACKGROUND OF THE INVENTION

Toward preventing the pollution of offshore as well as inland waters, and under circumstances where said pollution is effected through an excess of a non-water soluble hydrocarbon based liquid such as petroleum, deposited on the water, a number of means have been provided for treating the water whereby to bring about a desired separation. One such means is illustrated and claimed in our copending patent application entitled "Apparatus For Preventing Oil Pollution", filed Dec. 31, 1968, Ser. No. 816,876 issued as U.S. Pat. No. 3,638,796.

In said patent application, we have disclosed an apparatus which is fixedly positioned to the floor of an offshore body of water. The lower end of the apparatus is embedded in the substratum, the upper end being open to the atmosphere. The apparatus includes essentially a caisson which defines a liquid containing and separating chamber therein. The chamber receives a continuous stream comprising a two phase liquid mixture of water and a non-water soluble liquid petroleum based component.

Said apparatus further provides means whereby the two phase mixture undergoes a gravity separation within the caisson interior such that water passes to the bottom thereof and from the enclosed portion. The lighter component on the other hand, rises to the water's surface and is readily removed.

While the above apparatus does afford a degree of physical separation, its capabilities are limited essentially by the necessity to minimize the input volume of a two phase liquid mixture thereto. Of further consideration, with the desire on the part of industry to avoid water pollution particularly in the offshore areas as well as in the vicinity of petroleum producing and refining facilities, a pressing need has arisen for assuring that large amounts of water-oil mixtures can be treated continuously, rapidly and efficiently.

The instant apparatus is adapted to handle and separate any number of two phase liquid mixtures. However, for the sake of simplicity, the details of structure as well as of operation, will be noted herein in terms of the separation of crude oil or the like from water.

In the instance of offshore drilling operations such as those conducted from a fixed marine platform or a barge, in the process of producing oil from such a well a considerable amount of salt water as well as sand will be withdrawn along with crude petroleum product. In the past, this conglomerate product has been treated to effect an initial separation of the petroleum component from the water, the latter then being discharged overboard as useless.

While such a separation performs a basic function with respect to the crude oil, the discharged component still has retained an amount of the petroleum component even though slight. It has thus been found that such a discharge will cause a separation of the two phases, thereby permitting the oil to rise to the water's surface, a situation in the vicinity of the platform, a situation that is highly undesirable from the view of water pollution.

Toward providing a means whereby this effluent from the initial separation step can be further treated to remove the polluting agent or component, the instant apparatus is provided. The latter is particularly adapted to handle a relatively large volume of a water-oil mixture on a continuous basis, and without the use of operable components which would require maintenance.

The invention herein described and claimed comprises in essence a casing which defines a liquid holding separation chamber therein. The casing is disposed in a general vertical alignment and includes an internal labyrinthine passage which transverses said chamber in a generally vertical direction. Said passage is so formed through the casing to permit a gravity separation of the heavier water component, from the lighter petroleum products. The latter then rise to the periphery of the separating chamber for removal therefrom while the water flow continues down toward the casing lower end. Simultaneously, materials such as sand, clay, etc. are retained on the upper surface of the means utilized to form said labyrinth passage.

DESCRIPTION OF THE DRAWINGS

Referring to the drawings.

Figure 2:
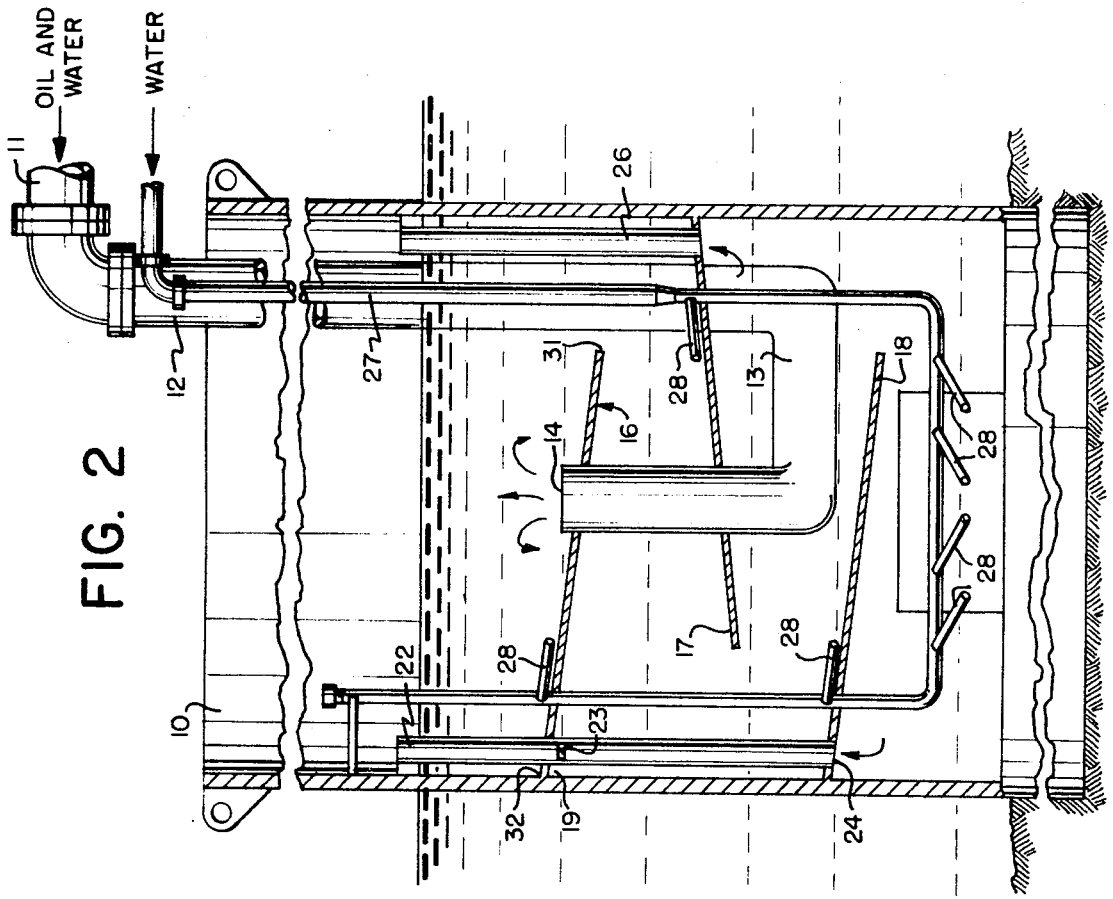
FIG. 2 is a top view of the embodiment shown in FIG. 1.

It is understood that while the instant device is described in terms of a fixed caisson type arrangement which is partially embedded at its lower end into the floor of a body of water, such a disclosure is for the purpose of describing one embodiment of the invention rather than to constitute a limitation thereof.

For example, the separation device can be supportably connected to a marine platform or other support structure fixed in the body of the water. Further the separation device is such as to permit it to be incorporated into a floating structure rather than one which is permanently located at the point of separation. However, as presently shown, the invention will be hereinafter disclosed in terms of a fixedly anchored arrangement which is normally disposed adjacent to, and in communication with one or more producing oil wells disposed in a body of water.

Referring to the drawings, the apparatus comprises an elongated tubular cssing 10 which is embedded in an upright stance, into the substratum beneath a body of water with the upper end thereof protruding from the water. Casing 10 thus defines a fluid holding enclosure or caisson.

The caisson can be formed with any one of a number of geometric shapes other than the circular configuration shown. For example, a square shaped unit or one of hexagonal configuration would serve as well in achieving the purpose of the instant arrangement.

The casing or caisson 10 is in general an elongated, uprightly aligned cylindrical member varying in diameter in accordance with the volume of fluid mixture to be handled. As presently shown, the caisson upper end is open to the atmosphere, although it may be covered with a closure member. The lower end is firmly embedded into the substratum beneath the body of water.

Caisson 10 is thus fixedly stationed to be communicated to one or more sources of the two phase water-oil mixture such as producing wells or the like in the vicinity. The upper end of caisson 10 extends beyond the water's surface a sufficient distance to be accessible to a barge or other vessel into which oil will be periodically pumped. It is also beyond the reach of waves, or normal tidal variations.

The caisson 10 lower or skirt end, is at least partially embedded into the substratum as by jetting, driving or otherwise. It could further be maintained in its desired stance by the use of piles or similar means disposed about the casing periphery and fastened thereto.

A conduit 11 is communicated at one end with a source of the water-oil mixture to be separated. Said conduit 11 in effect can be mentioned, be communicated with a number of producing wells or platforms in the area, or merely with a processing station which would have occasion to discharge oil laden water as a byproduct of its operation.

The interior of the caisson as shown contains an amount of liquid including a layer of oil resting at the water's surface. The oil is generally at a level approximating the level of the water at the casing exterior. Said conduit 11 is formed of pipe or tubing which extends from a collecting source for the mixture, and terminates at the caisson interior. Conduit 11 comprises a first or vertical segment 12 which defines a downward leg, and a second portion 13 which depends from the lower end of said first segment 12.

While the said first segment 12 is disposed generally vertically within caisson 10, its primary function is to conduct a stream of the two phase mixture to the caisson lower end. Thereafter, as the water-oil mixture enters the conduit J-shaped second portion 13, its direction is reversed so as to pass upwardly and be discharged through a port 14 at a point just beneath the water's surface.

Conduit 12 can be formed of a material such as a steel pipe or tubing, having a suitable surface coating to resist corrosion. Under normal circumstances a flow of the water-oil mixture will be directed into caisson 10 at a slightly static head defined by the back pressure at the source together with the distance of the vertical conduit segment 12 above the water's surface. Thus, the liquid mixture exiting at conduit discharge port 14 will be under a slight pressure to overcome the downward force exerted by water contained within the caisson.

To foster the continuous nature of the process, discharge port 14 opens within the caisson cylindrical separation chamber, being aligned substantially coaxially with the vertical axis of said chamber.

The means defining the labyrinthine passage extending coaxially of caisson 10 is formed by one or more, and usually a plurality of passage panels 16, 17 and 18 which are rigidly fastened to the peripheral walls of said chamber and extend radially thereinto. In the shown arrangement, the respective passage panels are canted downwardly from a horizontal disposition to define an oil retaining and accumulation well such as 19, at the underside of the one or more panels.

In one embodiment of said means forming said labyrinthine passage, the panels 16, 17 and 18 are arranged through caisson 10, and spaced longitudinally apart to permit a flow of the water-oil mixture therealong as the latter proceeds by gravity flow to the lower end of the caisson. In the instant arrangement the labyrinthine passage is defined between adjacent surfaces of the rigid panels 16, 17 and 18, which extend from the respective caisson side walls toward the opposite wall of the separating chamber.

The back ends of the respective panels 16, 17 and 18 are fastened to the wall of the caisson by welding or other means whereby to rigidly position said panels therein. Further, the interior or central lips of the respective panels are disposed in overlapping relationship one with the other to form the desired labyrinth-like path through the caisson's length.

Figure 1:
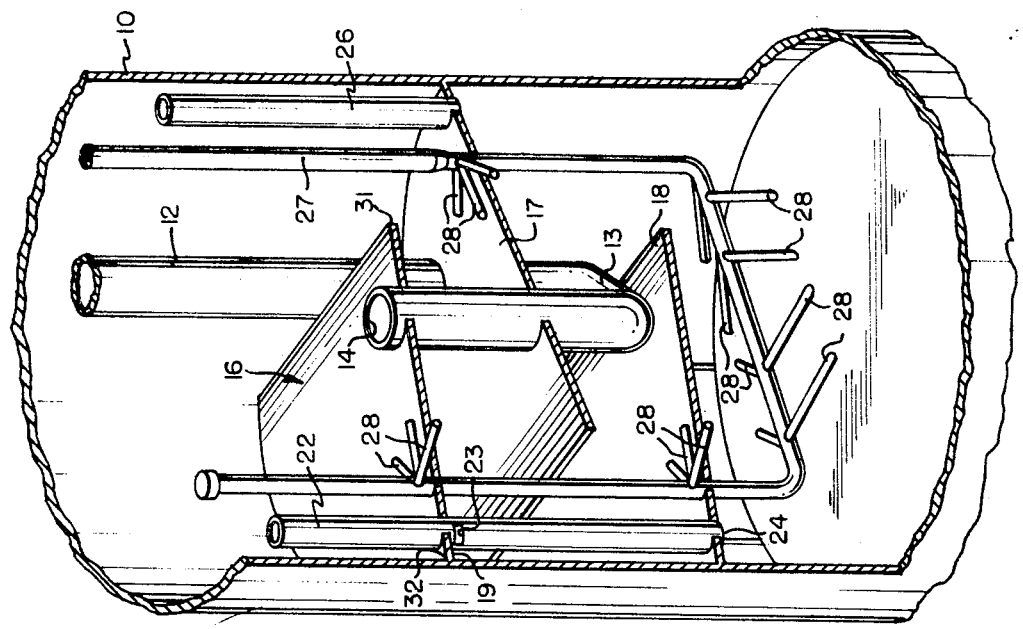
FIG. 1 is a vertical cross sectional view of the apparatus illustrating the internal elements to said device.

As shown in FIG. 1, the precise configuration of said panel inner edges is such as to extend substantially beyond the center axis of the caisson 10 and yet be spaced from the opposite wall thereof. The passage spacing from said opposite wall will be contingent on the flow volume which the passage must accommodate.

The respective passage forming panels, 16 for example, are canted from a horizontal disposition such that the inner edge 31 thereof is lower than the upper edge 32 to form a downwardly sloping path. Thus, the underside of each canted panel defines an arcuate area 19 adapted to receive lighter than water hydrocarbon products, and to retain the same as the oil free water flow continues downwardly through said passage.

The lighter than water component normally accumulated at the wall or underside of each of said panels 16, 17 and 18 is carried away by a collecting riser 22 having an inlet 23 disposed immediately adjacent to and contiguous with the underside of said panel 16. Said respective openings 23 and 24 are communicated by the riser 22 extending upwardly through the caisson and terminating at a point beyond the maximum water height within the caisson 10. Similar collecting conduits such as 26 can be likewise disposed around the periphery of the caisson to achieve the same function.

In each instance the top portion of collecting manifold or riser 22 extends upwardly adjacent to the level of the water retained within the caisson. It is understood that when the caisson is fixedly positioned at an offshore body of water subject to tidal variations the level of the water external to, as well as within the separating chamber will vary as the tide goes through its periodic cycles.

The upper surface of each of said panels 16, 17 and 18 is provided with means for discharging solids collected at the panel upper surface. In the present arrangement, there is provided a water or air carrying header including elongated conductor 27 which transverses the respective panels. The end of said conduit is communicated at its remote end to a source of compressed air or water.

As shown in FIG. 2, one or more constricted jets or nozzles 28 are fixed contiguous with each panel surface whereby to direct high velocity streams of water or air parallel to said surface. Thus, the latter will be swept clean of sand and other material otherwise accumulated at the panel upper surface. The sand is progressively swept from the respective panels and carried to the caisson floor.

Other modifications and variations of the invention as hereinbefore set forth may be made without departing from the spirit and scope thereof, and therefore, only such limitations should be imposed as are indicated in the appended claims.

We claim:

1. In a liquid treating apparatus within a body of water, for effecting a gravity separation of a two-phase, water-oil mixture, wherein the oil component of said mixture is of a lesser specific gravity than the water component, said apparatus including; an elongated casing having side walls forming a vertically disposed separation chamber with upper and lower ends, the lower end of said elongated casing extending downwardly through said body of water and being communicated with the latter, the improvement therein of conduit means communicated with a source of said two-phase water-oil mixture and having a discharge port positioned within the upper end of said separation chamber, means defining a vertically aligned labyrinth-like passage through said casing, said passage defining means including a plurality of contiguously arranged compartments formed by spaced apart panels, alternate panels having a peripheral segment thereof fixed to a wall of said casing and having a remote edge extending toward, but spaced from an opposite casing wall, whereby to overlap adjacent panels and communicate said respective compartments one with the other, each of said alternate panels being canted downwardly from the fixed peripheral segment thereof toward said panel remote edge, whereby to form an upwardly sloping surface along the underside of each panel, and a collecting pocket for the lesser specific gravity oil, said pocket being formed at the juncture of each panel edge with the casing wall, and conducting means communicated with the respective collecting pockets to remove oil therefrom.

2. In an apparatus as defined in claim 1, wherein said conduit means includes; an upper end communicated with a source of said water-oil mixture and extending downwardly into said elongated casing, and a lower end of said conduit means depending from said upper end and defining an upwardly directed segment which terminates at said discharge port adjacent the water's surface.

3. In an apparatus as defined in claim 2, wherein; said conduit means discharge port is disposed substantially coaxially with the caisson longitudinal axis.

4. In an apparatus as defined in claim 3, wherein said casing is cylindrically shaped; said plurality of panels depend alternately from opposite walls.

5. In an apparatus as defined in claim 1, including; jetting means disposed at the upper surface of said alternate panels, and including nozzles directed toward the panel surface for ejecting a pressurized stream of fluid against the latter to displace and remove sand accumulations therefrom.

* * * * *